H. W. CLAPP.
Hoeing Machine.
No. 96,549. Patented Nov. 9, 1869.
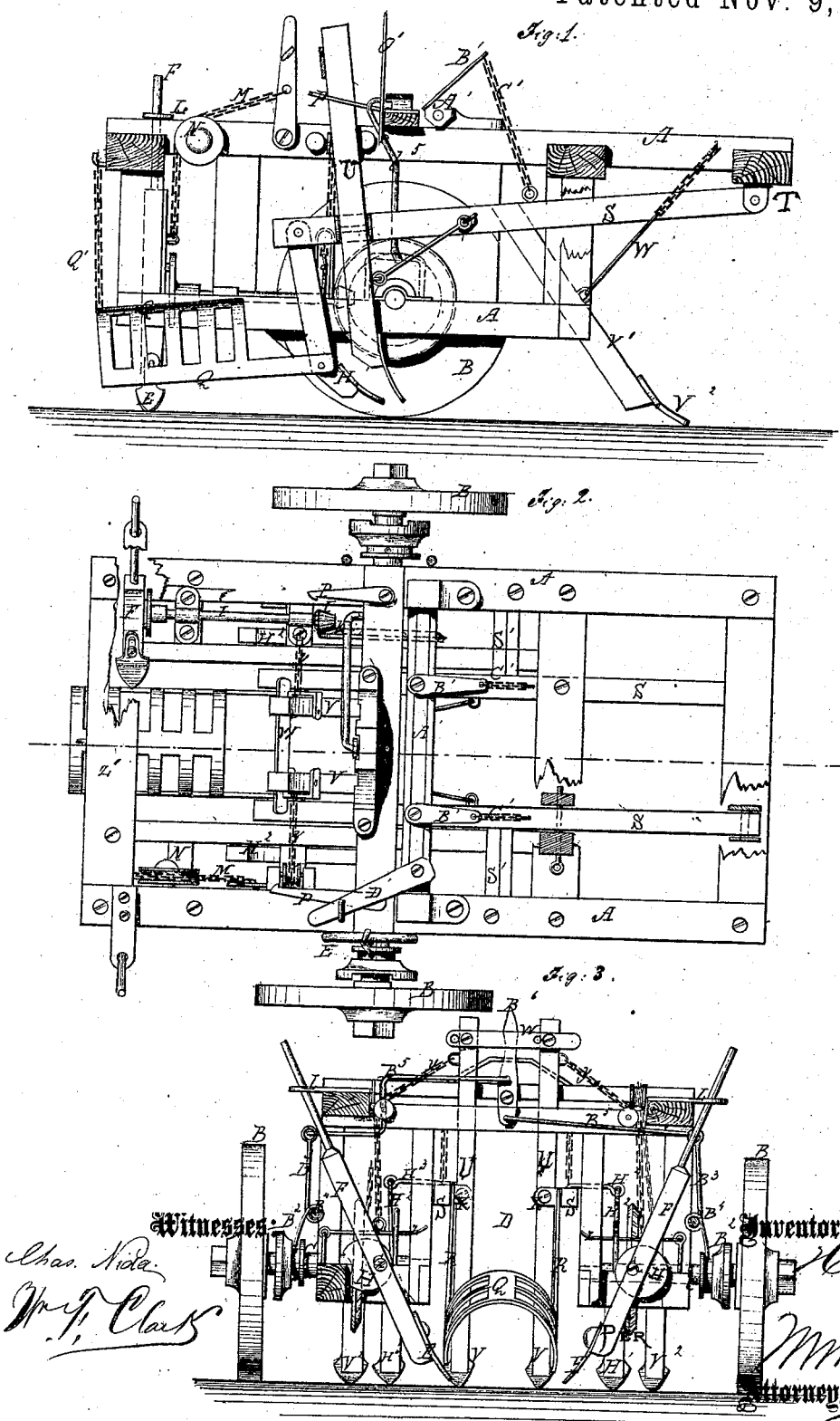

UNITED STATES PATENT OFFICE.

H. W. CLAPP, OF NORTHAMPTON, MASSACHUSETTS.

IMPROVEMENT IN HOEING-MACHINES.

Specification forming part of Letters Patent No. 96,549, dated November 9, 1869.

*To all whom it may concern:*

Be it known that I, H. W. CLAPP, of Northampton, in the county of Hampshire and State of Massachusetts, have invented a new and Improved Hoeing-Machine; and I do hereby declare that the following is a full, clear, and exact description thereof, which will enable others skilled in the art to make and use the same, reference being had to the accompanying drawings, forming part of this specification.

This invention relates to improvements in machines for cultivating corn and other vegetables planted in rows.

It consists, first, in an arrangement, upon a truck of two or more wheels, of two or more hoes or spades, moving to and from the row as the machine moves along by motion derived from the truck-wheels, so as to scrape or hoe the earth up to the roots of the plants, the said spades or hoes being raised above the ground when moving away from the plants, and down into contact with it when moving up toward them.

The invention consists, secondly, in the combination, with the said hoes or spades, of a shield for gathering the tops of the plants and holding them up, so as not to be covered or injured by the hoes; and the invention consists, thirdly, in the combination, with the said holes, of cultivators arranged to operate in the ordinary way, and provided with means for raising and lowering them; also, for guiding one pair of the said cultivators which run close to the plants laterally by the feet; and it consists, fourthly, in certain arrangements of parts for working, guiding, and operating the spades and cultivators.

Figure 1 represents a longitudinal sectional elevation of my improved machine. Fig. 2 represents a plan view of the same; and Fig. 3 represents a rear end elevation of the same.

A represents a suitable truck-frame, mounted on two wheels, B, and short separate axles C. The said frame is arranged with a wide and high clear space, D, at the center, so that it may be drawn along the row, with one wheel on each side of it, without injuring the plants. At the rear end of this frame, and on each side of the space D, I arrange one or more spades or hoes, E, fixed upon bars F, mounted on wrist-pins G of cranks or disks H of shafts I, journaled on the frame A at right angles to the axles, and deriving motion therefrom by gear-wheels K, so that the hoes have a movement to and from the row of plants, the said hoes being down in contact with the ground when moving toward them. The upper ends of these bars F are confined against lateral motion by passing through guide-eyes of plates L; or other similar devices which will accomplish the purpose may be used. The to-and-fro and rising-and-falling movement is imparted to these spades or hoes by the turning of the crank-shafts, as will be readily understood, and in moving toward the rows they scrape the soil up to the roots of the plants, distributing it evenly around them. Chains M are connected to the bars F, and rising up over pulleys N pivoted to the frame, and arranged to be turned forward to draw the spades upward and support them above the ground by being held in the said forward positions by spring-catches P at the top of the frame.

Q is a shield or guard composed of curved bars of wire, sheet metal, or other suitable substance connected to other parallel bars, R, suspended from the bars S, pivoted to the front of the frame A at T, so that the lower ends are drawn along the ground in a way to gather the side projecting branches of the plants and draw them inward just in advance of the spades to prevent injury to them by the side spades. These bars S also support the stocks U of a pair of cultivators, V, of ordinary construction, in advance of the shield and spades, one on each side of the row. The said stocks are connected together at the top by a bar, W, loosely jointed to them, so as to admit them to turn laterally on their pivot-joints X and chains Y, connected to the tops of the said stocks, pass over guide-pulleys to foot-treadles Z, so arranged that the operator, sitting on the seat at Z', may vibrate the cultivators V to or from the row of plants. The arms S are provided with other short arms, S', projecting at right angles from them horizontally, and toward the sides of the frame in advance of the cultivators V. To the outer ends of these arms are journaled the stocks V' of other cultivators, V², so as to oscillate on the said journals. These stocks V' are connected by brace chains or rods W' to the frame A, which sustains the resistance encountered when being drawn along on the ground. H' represents another pair of cultivators, the stocks of which are jointed to the frame A at H². Their stocks have links or rods H² connected to them near the bottom, and to the bars S by bars or rods H³, so that when the said bars are raised they will be also raised above the ground. These cultivators track between the cultivators V' and V², and the whole serve to work the ground thoroughly before the spades, so that the soil taken by them to deliver to the plants will be fresh and clean.

A' is a roller-shaft arranged transversely on the top of the frame A, and provided with arms B' and chains C', connecting the said arms with the bars S.

D' is a hand-lever connected to the shaft A' for turning it to raise or lower the bars S, to which the cultivators and the guard Q are connected. This hand-lever may be turned on its joint with the shaft A', so as to be engaged under a clutch, E', for holding the bars S up above the ground when required for transporting the machine from place to place. The guard Q is connected by a chain, Q', to a hook on the rear of the machine in a way to be suspended higher or lower, as required.

The wheels B are placed loosely on the axles, and have clutches B² for gearing the axles to them to be turned by the said wheel. These clutches slide on the axles, and are moved by bent levers B³, pivoted at B⁴, and connected by rods B⁵ to a hand-lever, B⁶, pivoted to the frame, and arranged to move the said clutches in opposite directions simultaneously.

Having thus described my invention, I claim as new and desire to secure by Letters Patent—

1. The combination, on a truck, of two or more hoes or spades, E E, arranged for operation by motion derived from the wheels of the truck, as herein shown and described.

2. The combination, with a pair of spades or hoes, operating as described, of a guard or shield, Q, movable and adjustable vertically, as described.

3. The combination, with the spades or hoes, arranged for operation, as described of the vibrating cultivators V V, as specified.

4. The combination, with the spades or hoes, of the cultivators V V and V' V², as specified.

5. The combination, with the spades or hoes E E, of the chains M, rollers N, levers O, and spring-catches P, as specified.

6. The combination of the spades or hoes, cultivators V V, V' V², and H', all as specified.

H. W. CLAPP.

Witnesses:
   M. F. SESSIONS,
   M. H. CLAPP.